March 8, 1932.   D. M. SOLENBERGER   1,848,910
COLLAPSIBLE OIL RING
Original Filed July 12, 1928
Fig. 1.
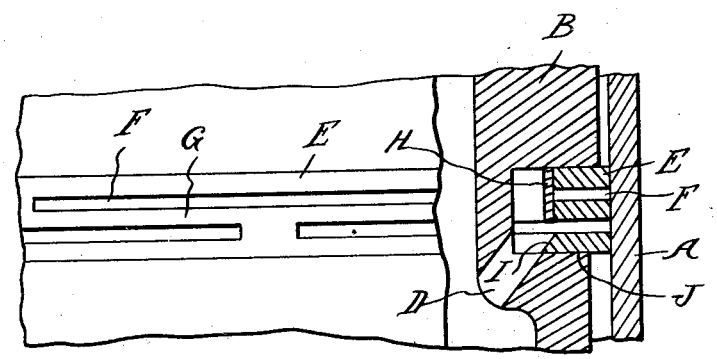
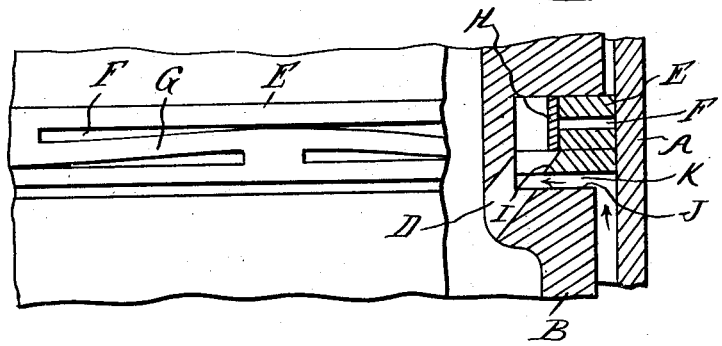
Fig. 2.
INVENTOR
Dean M. Solenberger
BY
ATTORNEYS Patented Mar. 8, 1932

1,848,910

UNITED STATES PATENT OFFICE

DEAN M. SOLENBERGER, OF CLEVELAND, OHIO, ASSIGNOR TO THE SIMPLEX PISTON RING COMPANY OF AMERICA INC., A CORPORATION OF OHIO

COLLAPSIBLE OIL RING

Application filed July 12, 1928, Serial No. 292,126. Renewed November 5, 1930.

The invention relates to piston rings more particularly designed for preventing the passage of oil into the explosion chamber and consists in the novel construction as hereinafter set forth.

In the present state of the art, one method of removing surplus oil from the walls of the cylinder is to provide a ring groove in the piston having oil drain apertures together with a ring in said groove having radially extending slots or apertures for the passage of oil inward into said groove. An objection to such a construction is that the apertures through the ring frequently become clogged with carbon or otherwise obstructed so that they cease to function in the removal of the oil.

Another type of ring that has been extensively used is one that is circumferentially slotted for axial resiliency and of a normal width slightly greater than that of the ring groove so that it must be axially compressed to enter the groove. Such rings are normally used in undrained ring grooves where the body of oil between the ring and the bottom of the groove together with that in the slots forms a cushion for resisting collapsing of the ring during operation. This is found to be the case even where the resilient axial pressure of the ring is less than the inertia forces developed therein during rapid reciprocation of the piston.

The construction forming the subject matter of the present application utilizes the axially collapsible ring last above referred to, together with a drained oil groove in the piston in which said ring is placed. The parts are so proportioned that during reciprocation of the piston the ring will collapse in its groove providing a clearance space for the passage of the oil into the ring groove from which it will escape through the drain apertures. Such a ring will perform the function of the first of the above described prior art rings but much more effectively in that the repeated collapsing and expansion of the ring will prevent any clogging of the oil passage through carbon deposits or other obstructions.

As illustrated in the drawings,

Figure 1 is a sectional elevation of a portion of a piston and cylinder with my improved ring engaged therewith;

Figure 2 is a similar view showing the ring in collapsed position.

As shown, A represents the wall of the cylinder, B a piston therein provided with a ring groove seat having one or more oil drain apertures D. E is the axially resilient and collapsible ring preferably formed by parallel series of staggered circumferential slots F forming intermediate resilient bars G. The parts are so proportioned that when the ring is placed in the ring groove, the axial tension is sufficient to maintain sealing contact between the upper and lower surfaces of said ring and the respective adjacent surfaces of the ring groove. However, this axial tension is so limited that in operation, the pressure of the oil together with the inertia forces produced by the reciprocation of the piston will further collapse the ring, opening a radially extending passage for the oil. Only a slight degree of collapsing is necessary for the passage extends completely around the circumference of the piston permitting a large quantity of oil to pass through a very narrow slot.

The specific proportion of the parts depends upon various conditions, but I have found that a collapsing movement not to exceed five thousandths of an inch is usually sufficient for the passage of the surplus oil into the drain groove and that this amount of collapsing movement will not produce a detrimental pounding effect of the ring against the wall of the groove.

To maintain the peripheral seal of the ring with the wall of the cylinder, I preferably use a corrugated ribbon expander H which is placed between the inner face of the ring and the bottom of the ring groove. This expander is preferably of a width less than the width of the ring so as to provide clearance for the passage of the oil into the groove and to hold on the expander in raised position, the ring may be provided with an inwardly extending lip I. This serves a further function of increasing the width of the ring engaging the land on the piston which is particularly desirable as said land J on the lower side of the ring is preferably cut away to provide greater clearance for the oil.

In operation during the downward stroke of the piston the accumulation of oil on the walls of the cylinder will be scraped off by the ring F with the exception of the necessary film for maintaining lubrication. The pressure of the oil below the ring will cause it to collapse, opening a narrow annular passage K through which the oil flows into the groove C. From the latter, it will drain out through the apertures D back into the crank case. Upon the reverse or upper stroke of the piston, the ring again expands through the groove and as the oil above the ring is only a lubricating film there will be but little tendency to produce collapsing. However, should the ring collapse in its upward stroke as well as in its down, no harm would result for sealing may be effected by other rings not shown placed higher on the piston.

What I claim as my invention is:

1. The combination with a cylinder and a reciprocating piston therein, of a ring engaging a drained groove in one of said members and maintaining peripheral sealing contact with the other of said members, said ring having a portion axially collapsible during the reciprocation of the piston to provide clearance between the same and the wall of the groove for the passage of oil.

2. In combination with a cylinder and a piston therein, of a ring engaging a drained ring groove in one of said members circumferentially slotted for axial resiliency and with an axial tension permitting collapsing during reciprocation of the piston to provide radial passage for the oil into said drained groove.

3. In combination with a cylinder and a reciprocating piston therein, of a ring provided with staggered series of overlapping circumferential slots to produce axial resiliency, the axial tension holding the sides of the ring against the walls of the groove while in static condition but permitting collapsing of the ring for the opening of an oil passage between the same and the side wall of the groove during the reciprocation of the piston.

In testimony whereof I affix my signature.

DEAN M. SOLENBERGER.